Jan. 25, 1966 F. L. BEDNARZ 3,230,826
WIDE ANGLE LENS SYSTEM
Filed Dec. 13, 1961 3 Sheets-Sheet 1

INVENTOR.
FELIX L. BEDNARZ
BY
Emery, Whittemore, Sandoe & Graham
ATTORNEYS.

Jan. 25, 1966   F. L. BEDNARZ   3,230,826
WIDE ANGLE LENS SYSTEM
Filed Dec. 13, 1961   3 Sheets-Sheet 2

INVENTOR.
FELIX L. BEDNARZ
BY
ATTORNEYS.

Jan. 25, 1966  F. L. BEDNARZ  3,230,826
WIDE ANGLE LENS SYSTEM
Filed Dec. 13, 1961  3 Sheets-Sheet 3

INVENTOR.
FELIX L. BEDNARZ
BY
ATTORNEYS.

United States Patent Office 3,230,826
Patented Jan. 25, 1966

1

3,230,826
WIDE ANGLE LENS SYSTEM
Felix L. Bednarz, Hollywood, Calif., assignor, by mesne assignments, to Bank of America National Trust and Savings Association
Filed Dec. 13, 1961, Ser. No. 158,970
4 Claims. (Cl. 88—57)

This invention relates to a wide angle lens system adapted, when used in a camera, to photograph an extremely wide field angle, or when used in a projector, to project an extremely wide angle image onto a spherical screen.

The invention is an improvement on the wide angle lens system of my prior Patent No. 2,791,153 dated May 7, 1957.

It is an object of the present invention to provide a wide angle lens system having an even wider field angle than that of the lens system of my prior patent, 160° as compared with 142°, at an aperture of f/2.0, as compared with the f/2.2 aperture of the patent.

It is a further object of the invention to provide a wide angle lens system of increased focal length, i.e. more than double that of the lens system of the patent, whereby it is possible to cover a larger film format, i.e. film up to 70 mm. width, at the focal plane.

It is a further object of the invention to provide a wide angle lens system which is very compact, and in which, despite the increase in focal length, the overall length of the system is less than that of the lens system of the patent.

Other objects and advantages of the invention will appear hereinafter.

A preferred embodiment of the invention selected for purposes of illustration is shown in the accompanying drawings, in which, FIGURE 1 is a longitudinal section through the lens system showing the lens components mounted in a suitable casing.

Figure 1:
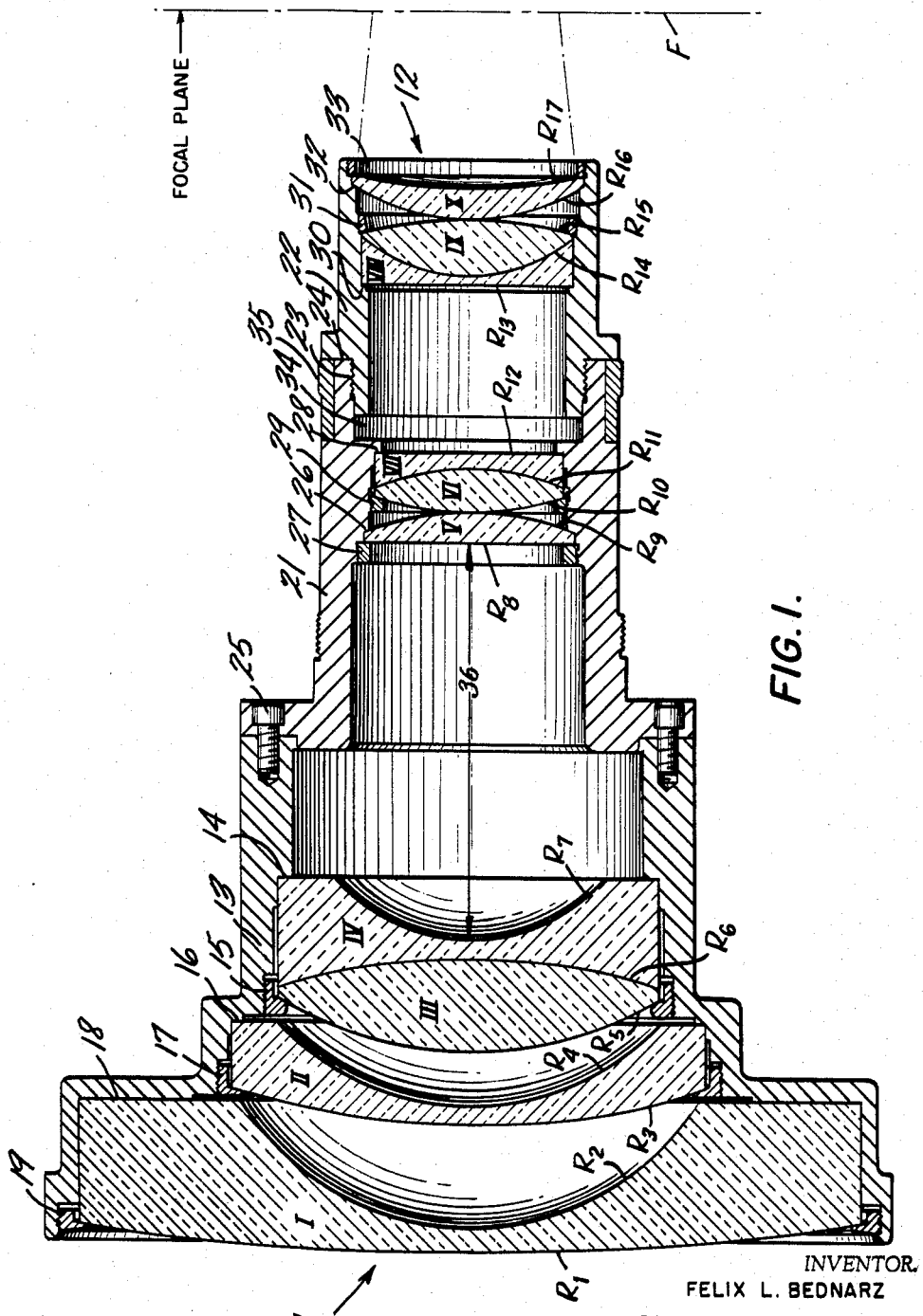

Referring to the drawings, the lens system comprises a negative objective designated generally by 11 and a positive objective designated generally by 12.

The negative objective comprises four lens elements I, II, III and IV, and the positive objective comprises six lens elements V, VI, VII, VIII, IX and X, the numbering being in sequence from the front of the lens system.

As shown in FIG. 1, the four lens elements of the negative objective are mounted in a stepped tubular casing member 13. Lens elements III and IV constituting a cemented doublet are seated against a shoulder 14 and held in place by a threaded ring 15 engaging the threaded wall of the casing. Lens element II is seated against shoulder 16 and is held in place by a threaded ring 17 engaging the threaded wall of the casing. Lens element I is seated against a shoulder 18 and is held in place by a threaded ring 19 engaging the threaded wall of the casing.

The six lens elements of the positive objective are mounted in tubular casing members 21 and 22 which are secured together by screw threads 23, the casing members being held in fixed position by abutment of the shoulder 24 against the end wall of the casing member

2

21. The casing member 21 is secured to the casing member 13 by screws 25.

Lens element V is seated against shoulder 26 of casing member 21 and is held in place by a threaded ring 27 engaging the threaded wall of the casing. Lens elements VI and VII constituting a cemented doublet are seated against shoulder 28 of casing member 21 and held in place by a threaded ring 29 engaging the threaded wall of the casing.

Lens elements VIII and IX constituting a cemented doublet are seated against shoulder 30 of casing member 22 and are held in place by a threaded ring 31 engaging the threaded wall of the casing. Lens element X is seated against shoulder 32 of casing member 22 and is held in place by a threaded ring 33 engaging the threaded wall of the casing.

In mounting the lens elements in the casing suitable cushioning gaskets may be supplied where required in accordance with usual practices in the art.

A space 34 is provided within the casing member 21 for the reception of a suitable iris diaphragm (not shown) which may be operated by a ring 35 rotatably mounted on the outside of the casing member 21.

In the use of the lens, the film to be exposed or projected is located at the focal plane F behind the positive objective.

Figure 2:
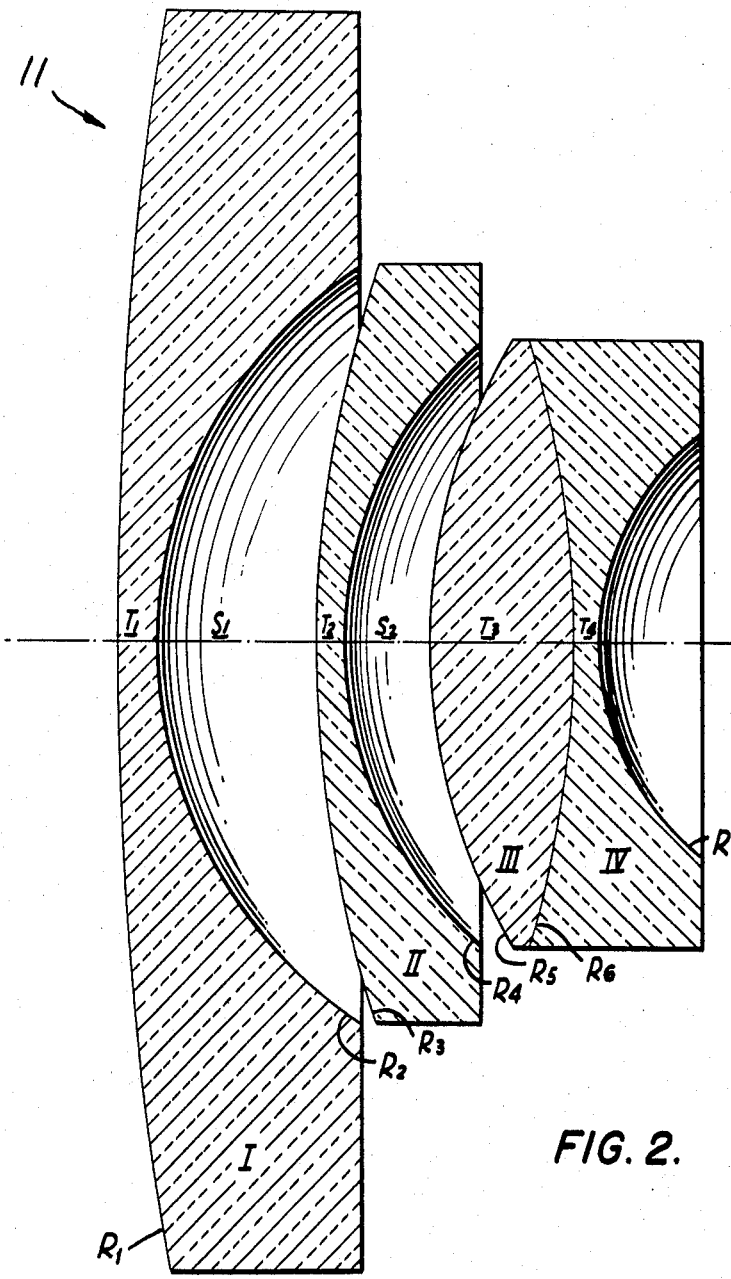
FIGURE 2 is a longitudinal section through the lens components of the negative objective.

FIG. 2 illustrates in detail the lenses of a specific example of a negative objective embodying the present invention, the specifications of which are set forth in the following table:

*Table I*

| Element | ND | V | Radii | Thicknesses and separations |
|---|---|---|---|---|
| I | 1.611 | 58.8 | $R_1=30.516\pm.050$ | $t_1=.305\pm.010$ |
|   |   |   | $R_2=3.352\pm.010$ | $s_1=1.262\pm.010$ |
| II | 1.611 | 58.8 | $R_3=9.155\pm.015$ | $t_2=.203\pm.010$ |
|   |   |   | $R_4=3.052\pm.010$ | $s_2=.671\pm.010$ |
| III | 1.720 | 29.3 | $R_5=4.577\pm.010$ | $t_3=1.119\pm.010$ |
| IV | 1.611 | 58.8 | $R_6=-8.138\pm.050$ | $t_4=.203\pm.010$ |
|   |   |   | $R_7=2.034\pm.003$ |   |

In the first column of the above table the lens elements are numbered from I to IV to correspond to the numbering of FIGS. 1 and 2. The second column, headed "ND," gives the refractive index N for the sodium line D of the spectrum for the glass used in each lens. The third column, headed "V," gives the dispersive index V or Abbe's number for the glass used in each lens. In the fourth column, headed "Radii," the lens surfaces are numbered from $R_1$ to $R_7$ to correspond to the numbering of FIG. 2 and the numerical value of each radius is given in inches. In the fifth column, headed "Thicknesses and Separations," the thicknesses of the lenses are numbered from $t_1$ to $t_4$ to correspond to the numbering of FIG. 2, and the separations between lenses are numbered $s_1$ and $s_2$ to correspond to the numbering of FIG. 2. The thickness and separation values are given in inches. The + and − signs before the values in the fourth column indicate surfaces which are convex and concave, respectively, to the front of the system. The ± signs after the values in the fourth and fifth columns indicate tolerances.

Figure 3:
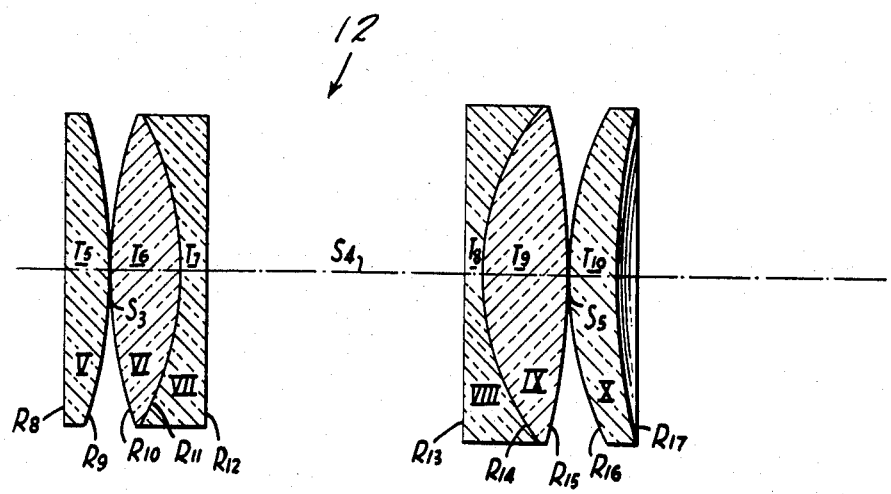
FIGURE 3 is a longitudinal section through the lens components of the positive objective.

FIG. 3 illustrates in detail the lens elements of a specific example of a positive objective embodying the present invention, the specifications of which are set forth in the following table:

Table 2

| Element | ND | V | Radii | Thicknesses and Separations |
|---|---|---|---|---|
| V | 1.605 | 38.0 | $R_8 = \infty$ | $t_5 = .346\pm.005$ |
| | | | $R_9 = -3.865\pm.005$ | $s_3 = .005$ |
| | | | $R_{10} = 4.152\pm.005$ | |
| VI | 1.611 | 58.8 | $R_{11} = -2.689\pm.005$ | $t_6 = .538\pm.005$ |
| VII | 1.720 | 29.3 | $R_{12} = \infty$ | $t_7 = .200\pm.005$ |
| | | | | $s_4 = 2.000$ |
| | | | $R_{13} = \infty$ | |
| VIII | 1.720 | 29.3 | $R_{14} = 2.016\pm.005$ | $t_8 = .119\pm.005$ |
| IX | 1.611 | 58.8 | $R_{15} = -5.600\pm.010$ | $t_9 = .647\pm.005$ |
| | | | | $s_5 = .005$ |
| | | | $R_{16} = 2.667\pm.002$ | |
| X | 1.611 | 58.8 | $R_{17} = 5.991\pm.005$ | $t_{10} = .376\pm.005$ |

In the first column of the above table the lens elements are numbered from V to X to correspond to the numbering of FIGS. 1 and 3. The data recorded in the second to fifth columns is as previously described with reference to Table 1. The symbol $\infty$ indicates a surface of infinite radius, i.e. a plane surface.

The focal length of a negative objective having the specifications of Table 1 is approximately $-1.885''$. The focal length of a positive objective having the specifications of Table 2 is approximately $3.245''$. The overall focal length of the system is approximately $.952''$.

In a lens system embodying negative and positive objectives having the specifications of Tables 1 and 2, respectively, the separation 36 between the objectives, i.e. the axial distance from the center of the surface indicated by $R_7$ to the center of the surface indicated by $R_8$, is approximately $4.801''$. The overall length of the lens system, i.e. the axial distance from the center of the surface indicated by $R_1$ to the center of the surface indicated by $R_{17}$ is slightly less than $13.0''$. The back focal distance, i.e. distance from the center of the surface indicated by $R_{17}$ to the focal plane is approximately $2.067''$. The lens system covers a field angle of 160° at $f/2.0$. At the focal plane, the lens system forms an image covering a circle having a diameter of approximately $2.25''$, which is adequate for use with 70 mm. film.

A feature of importance to the attainment of the objects of the invention is the ratio of the focal length of the negative objective to the focal length of the positive objective. Thus in the lens system embodying negative and positive objectives having the specifications of Tables 1 and 2, respectively, in which the focal length of the negative objective is $-1.885''$ and the focal length of the positive objective is $3.245''$, this ratio equals $-.58$. To attain the objects of the invention, this ratio should not be less than $-.50$ nor greater than $-.65$.

An additional feature of importance to the attainment of the objects of the invention is the ratio of the separation 36 between the objectives to the overall focal length of the lens system. Thus, in the lens system embodying negative and positive objectives having the specifications of Tables 1 and 2, respectively, in which the separation 36 between the objectives is $4.801''$ and the overall focal length of the lens system is $.952''$, this ratio equals 5.04. To attain the objects of the invention, this ratio should not be less than 4.0 nor greater than 5.5.

In the assembly of the lens elements into the casing, the lens elements VIII, IX and X are mounted in the casing member 22 and secured in fixed position of adjustment by the rings 31 and 33. Similarly, the lens elements V, VI and VII are mounted in the casing member 21 and secured in fixed position of adjustment by rings 27 and 29. Assembly of the casing members 21 and 22 as shown in FIG. 1 provides the proper separation between lens elements VII and VIII. Similarly, lens elements I, II, III and IV are mounted in the casing member 13 and secured in fixed position of adjustment by rings 15, 17 and 19. Assembly of the casing members 13 and 21 as shown provides the proper separation between objectives. After the lens elements are assembled and adjusted, no further adjustment is required during the normal use of the lens system. In focusing, the entire assembly is moved as a unit with respect to the focal plane.

The lens system is adapted for use in a camera for photographing a wide angle field, and is also adapted for use in a projector for projecting onto the concave surface of a wide angle spherical screen. In projecting onto a spherical screen, the projector may be placed either at the center of the spherical surface or a reasonable distance in front of or behind the center of the spherical surface, the lens system having sufficient depth of focus to project a sharp image even when offset from the center of the spherical surface.

It will be understood that the invention may be variously modified and embodied within the scope of the subjoined claims.

I claim as my invention:

1. A photographic lens system comprising a negative objective comprising four lens elements in axial alignment and made substantially according to the specification in the following table:

| Element | ND | V | Radii | Thicknesses and Separations |
|---|---|---|---|---|
| I | 1.611 | 58.8 | $R_1 = 30.516\pm.050$ | $t_1 = .305\pm.010$ |
| | | | $R_2 = 3.352\pm.010$ | $s_1 = 1.262\pm.010$ |
| | | | $R_3 = 9.155\pm.015$ | |
| II | 1.611 | 58.8 | $R_4 = 3.052\pm.010$ | $t_2 = .203\pm.010$ |
| | | | | $s_2 = .671\pm.010$ |
| | | | $R_5 = 4.577\pm.010$ | |
| III | 1.720 | 29.3 | $R_6 = -8.138\pm.050$ | $t_3 = 1.119\pm.010$ |
| IV | 1.611 | 58.8 | $R_7 = 2.034\pm.003$ | $t_4 = .203\pm.010$ | and a positive objective comprising six lens elements in axial alignment and in axial alignment with the lens elements of the negative objective and made substantially according to the specifications in the following table:

| Element | ND | V | Radii | Thicknesses and Separations |
|---|---|---|---|---|
| V | 1.605 | 38.0 | $R_8 = \infty$ | $t_5 = .346\pm.005$ |
| | | | $R_9 = -3.865\pm.005$ | $s_3 = .005$ |
| | | | $R_{10} = 4.152\pm.005$ | |
| VI | 1.611 | 58.8 | $R_{11} = -2.689\pm.005$ | $t_6 = .538\pm.005$ |
| VII | 1.720 | 29.3 | $R_{12} = \infty$ | $t_7 = .200\pm.005$ |
| | | | | $s_4 = 2.000$ |
| | | | $R_{13} = \infty$ | |
| VIII | 1.720 | 29.3 | $R_{14} = 2.016\pm.005$ | $t_8 = .119\pm.005$ |
| IX | 1.611 | 58.8 | $R_{15} = -5.600\pm.010$ | $t_9 = .647\pm.005$ |
| | | | | $s_5 = .005$ |
| | | | $R_{16} = 2.667\pm.002$ | |
| X | 1.611 | 58.8 | $R_{17} = 5.991\pm.005$ | $t_{10} = .376\pm.005$ | where the respective lens elements in the Element column are numbered in sequence from the front of the system, the values in the ND column are the refractive indices for the sodium D line of the respective lens elements, the values in the V column are the dispersive indices of the respective lens elements, the R values in the Radii column are the radii of curvature of the surfaces of the respective lens elements with + and − symbols indicating surfaces which are convex and concave respectively to the front of the system, with $R_6$, $R_{11}$ and $R_{14}$ being cemented radii between elements III and IV, VI and VII, and VIII and IX respectively and the $t$ and $s$ values in the Thicknesses and Separations column are the thicknesses of and separations between the respective lens elements.

2. A photographic lens system as claimed in claim 1 in which the separation between the negative and positive objectives is approximately 4.801".

3. A photographic lens system as claimed in claim 2 in which the overall length of the system is less than 13.0".

4. A photographic lens system as claimed in claim 2 in which the back focal distance is approximately 2.067" and in which the image circle at the focal plane has a diameter of approximately 2.25".

References Cited by the Examiner
UNITED STATES PATENTS

| | | | |
|---|---|---|---|
| 2,791,153 | 5/1957 | Bednarz | 88—57 |
| 2,803,997 | 8/1957 | Hopkins | 88—57 |

FOREIGN PATENTS

| | | |
|---|---|---|
| 620,538 | 10/1935 | Germany. |

JEWELL H. PEDERSEN, *Primary Examiner.*